United States Patent [19]

Hai-Doo et al.

[11] Patent Number: 5,081,082

[45] Date of Patent: Jan. 14, 1992

[54] PRODUCTION OF ALUMINA CERAMICS REINFORCED WITH $\beta'''$-ALUMINA

[75] Inventors: Kim Hai-Doo; Lee Soo-Young; Ko Jae-Woong; Kang Hyo-Wan, all of Changwon, Rep. of Korea

[73] Assignee: Korean Institute of Machinery and Metals, Rep. of Korea

[21] Appl. No.: 618,569

[22] Filed: Nov. 27, 1990

Related U.S. Application Data

[63] Continuation-in-part of Ser. No. 464,878, Jan. 17, 1990, abandoned.

[51] Int. Cl.$^5$ .............................................. C04B 35/10
[52] U.S. Cl. .................... 501/153; 501/119; 501/125
[58] Field of Search ............... 501/118, 119, 120, 121, 501/125, 153

[56] References Cited

U.S. PATENT DOCUMENTS 3,535,163  11/1916  Dziecoich et al. .................... 136/6
3,895,963  7/1975  McGolann et al. .................. 136/153
3,903,225  9/1975  Jones et al. ............................ 264/56

Primary Examiner—William R. Dixon, Jr.
Assistant Examiner—Chris Gauo
Attorney, Agent, or Firm—Finnegan, Henderson, Farabow, Garrett & Dunner

[57] ABSTRACT

A process for producing strong alumina ceramics in which needle-shaped $\beta'''$-alumina grains are homogeneously distributed in an $\alpha$-alumina matrix to provide an increase in bending strength, as compared to the alumina ceramics without $\beta'''$-alumina, when fired under similar conditions. The process comprises mixing $\alpha$-alumina powder and salts of sodium and magnesium, in a Na:Mg mol ratio of 1:2; wet-mixing and calcining the mixture to form a mixture of $(100-5X)$ mols of $Al_2O_3 + X(Na_2O + 4MgO)$, wherein X is the number of mols and is not more than 3; forming a dense green body of the calcined mixture and sintering the green body at a temperature and for a time sufficient to form in-situ particles of $\beta'''$-alumina distributed in the $\alpha$-alumina.

7 Claims, 4 Drawing Sheets

PRODUCTION OF ALUMINA CERAMICS REINFORCED WITH β'''-ALUMINA

This is a continuation-in-part application of application Ser. No. 07/464,878, filed Jan. 17, 1990, now abandoned.

FIELD OF THE INVENTION

This invention relates to alumina ceramics, and, particularly, it relates to an alumina ceramic reinforced with β'''-alumina.

BACKGROUND OF THE INVENTION

Alumina ceramics are one of the most widely used technical ceramics. Alumina ceramics show excellent hardness which means, in turn, excellent wear-resistance. They are used in applications such as mechanical seals, yarn guides and the like. Alumina ceramics show, however, severe brittleness, which often necessitates toughening of the ceramics. The transformation toughening by $ZrO_2$ in an alumina matrix is quite well known. Rather recently, SiC whiskers have also been widely used to toughen alumina ceramics. However, several problems have been observed in the following areas;
i) Difficulty in obtaining homogeneous mixing of SiC whiskers with alumina powder and difficulty in full densification of the mixture;
ii) Instability of SiC whiskers in oxidizing environments; and
iii) Health hazards presented by SiC whiskers.

β-, β''- and β'''-aluminas are well-known and have been discussed frequently in the literature. For example, see (1) Bettman, M. and Terner, L. L. "On the structure of $Na_2O.4MgO.15Al_2O_3$, a variant of β-alumina", Inorg. Chem. 10, 1442, (1971), (2) Kummer, J. T. "β-alumina electrolytes" (Progress in Solid State Chemistry) Ed. Reiss, H. and McCaldin, J. O. PP. 141-75, (1972), (3) Reijnen, P, and Kim, H. D. "The influence of $Na_2O$ on sintering and creep of alumina doped with MgO and $TiO_2$" cfi/Ber. DKG 63, 272-79, (1986), (4) Reijnen, P. and Kim, H. D. "Microstructure development in alumina" VIII. Yugoslav-German Meating on Materials Science and Development, May, (1987) pp. 91-97 and (5) Kim, H. D. and Reijnen, P., "Effect of $Na_2O$ on alumina sintering" The 10th Korea Symposium on Science Section, pp. 179-95.

When sodium and magnesium (Na/Mg=½) are present as impurities in alumina sintering, sodium aluminate (β-alumina, $NaAl_{11}O_{17}$) and magnesium spinel ($MgAl_2O_4$) are formed at relatively low temperatures such as 1100° C. and, as the temperature increases, β-alumina and Mg spinel react with each other to give β'''-alumina by the following reaction;

$$NaAl_{11}O_{17} + 2MgAl_2O_4 = NaMg_2Al_{15}O_{25}$$

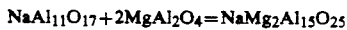

(β-alumina) (Mg spinel) (β'''alumina)

SUMMARY OF THE INVENTION

In order to avoid the problems associated with the use of SiC whiskers, we have determined that the in-situ synthesis of reinforcing materials in the matrix is one of the best possible solutions. We have found that β'''-alumina ($NaMg_2Al_{15}O_{25}$) is suitable for such a reinforcing material because it grows as "laths" or needle-shaped grains. β'''-alumina is thermally stable relative to β-alumina and β''-alumina, and is very easily formed during high temperature sintering, such as over 1600° C. when small amounts of sodium and magnesium (Na/Mg=½) are present.

The present invention provides a method by which alumina ceramics are strengthened by the in-situ formation of needle shaped β'''-alumina grains in an alpha alumina matrix without causing such problems as in the case of SiC whiskers.

In accordance with the present invention mixture of α-alumina, $Na_2O$ and MgO is reaction sintered at a high temperature for a time sufficient to form β'''-alumina grains in situ in a matrix of α-alumina. This sintering typically is conducted by heating the mixture at about 1600° C. to about 1700° C. in air, or by hot-pressing it at 1550° C. to 1650° C. under 30–60 MPa pressure for 1-hours.

In formulating the above mixture the content of $Na_2O$ to MgO is fixed at a mol ratio of 1:4 i.e., the Na to Mg mol ratio is 1:2. The quantity of β'''-alumina in the final product is controlled by X, the number of moles, of a composition having the formula $(100-5X)Al_2O_3+X(Na_2O+MgO)$. In accordance with the present invention X may vary from a small fraction, e.g., 0.2, up to a number not greater than about 3.0. Rational analysis calculations of the amount of β'''-alumina formed in the sintered product of the present invention indicate that, as shown in the following table, when X is varied from 0 to 3.0 then quantity of β'''-alumina varies from 0 to 56.6 wt. %.

TABLE

After sintering calculated quantity of β'''-alumina by rational analysis <wt. %>

| | Composition | |
|---|---|---|
| X | alpha-$Al_2O_3$ | Quantity of β'''-Alumina ($NaMg_2Al_{15}O_{25}$) |
| 0 | 100 | 0 |
| 0.5 | 91.3 | 8.7 |
| 1.0 | 82.4 | 17.6 |
| 1.5 | 73.2 | 26.8 |
| 3.0 | 43.2 | 56.6 |

BRIEF DESCRIPTION OF THE DRAWINGS

The present invention will be better understood by reference to the accompanying drawings wherein.

BRIEF DESCRIPTION OF PREFERRED EMBODIMENTS OF THE INVENTION

Figure 1:
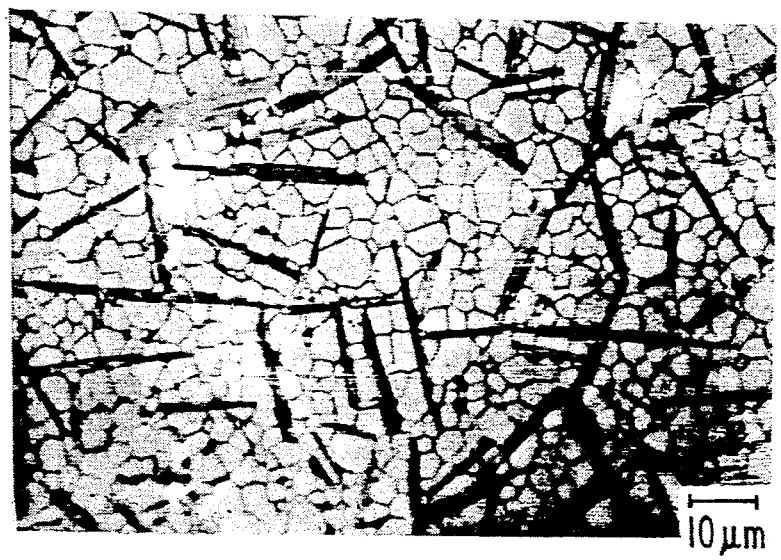
FIG. 1 shows the microstructure of alumina reinforced with β'''-alumina.
Figure 2:
FIG. 2 shows the microstructure of β'''-alumina showing the lamellar structure of the laths, or needle-shaped grains.
Figure 3:
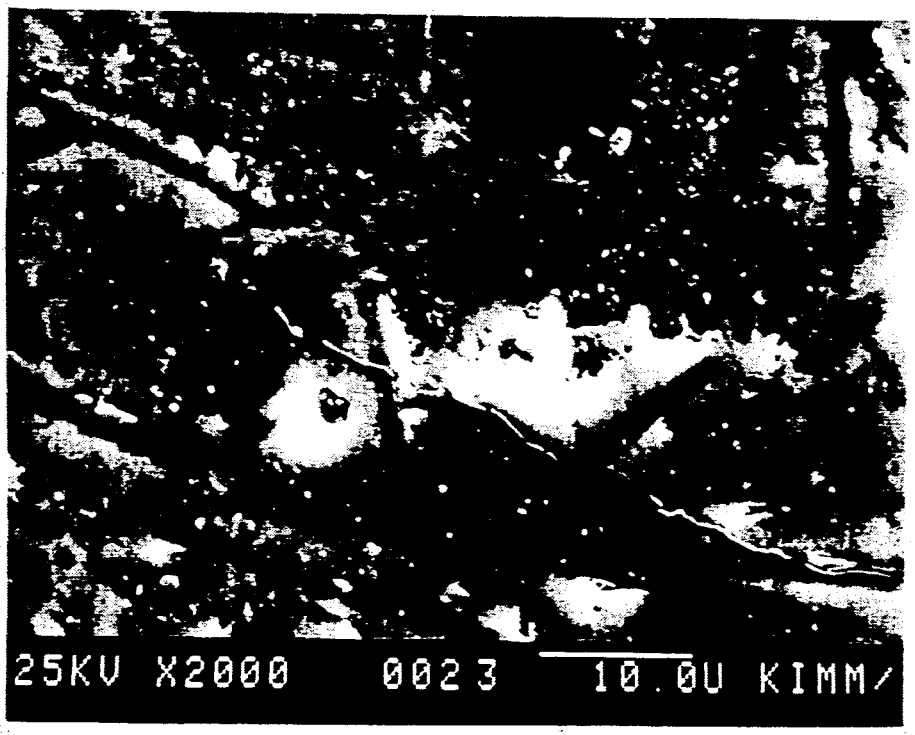
FIG. 3. shows the microstructure of β'''-alumina after indentation.
Figure 4:
FIG. 4. shows the microstructure of alumina reinforced with β'''-alumina after indentation showing the mode of fracture.

In order to obtain the needle-shaped β'''-alumina grains in an α-alumina matrix, mixtures were prepared having the formula $(100-5X) Al_2O_3+X(Na_2O+4MgO)$, wherein X, the number of moles of $(Na_2O+4MgO)$, varied from 0 to 3. The powder mixtures were wet-mixed and calcined. Some of the calcined products were ground and sintered at 1600° C.–1700° C. in air, and others were hot-pressed at 1550° C.–1650° C. under 30–60 MPa pressure for 1-3 hours in vacuum or Ar atmospheres.

The detailed procedure for the fabrication of this product is described as follows:

1. Mixing

Acetate, nitrate and sulfate salts of Na and Mg were dissolved in water to provide a Na:Mg ratio of 1:2, and appropriate amounts of alpha alumina were added to portions of the above solution to give slurries which upon calcination have the molar composition of (100-5X)Al$_2$O$_3$+X(Na$_2$O+4MgO), wherein X=0-3.

2. Drying and calcination

The wet-mixtures were dried and calcined at 800° C. for 6 hrs.

3. Sintering

After calcination, pressed tablets of the mixtures were sintered at 1600° C.-1700° C. for 1-10 hrs in air. Other portions of the mixtures were also hot-pressed at 1550° C.-1650° C. under 30-60 MPa pressure for 1-3 hrs. Hot-pressing was conducted under vacuum or an Ar atmosphere.

Table 1 shows the chemical compositions of the above calcined mixtures, both on a wt. percent basis and a molar percent basis, for samples having varying molar concentrations of (Na$_2$O+4MgO).

TABLE 1

The chemical compositions depending on x

| No | x(Na$_2$O + 4MgO)x | Al$_2$O$_3$ | Na$_2$O | MgO |
|---|---|---|---|---|
| 1 | 0 | 100 (100) | 0 | 0 |
| 2 | 0.5 | 97.5 (98.9) | 0.5 (0.3) | 2.0 (0.8) |
| 3 | 1.0 | 95 (97.8) | 1.0 (0.6) | 4.0 (1.63) |
| 4 | 1.5 | 92.5 (96.6) | 1.5 (0.95) | 6.0 (2.5) |
| 5 | 3.0 | 85 (92.8) | 3 (2) | 12.0 (5.2) |

( ): calculated as wt. %

Table 2 shows the effects of varying the molar concentration of (Na$_2$O+4MgO) and of varying the sintering conditions on the physical properties of the alumina.

TABLE 2

Physical and mechanical properties of the products

| No. | x | Sintering Conditions [°C.] Temp. | [hr] Time | [MPa] pressure | atm. | bulk density (gr/cm$^3$) | Bending Strength (MPa) |
|---|---|---|---|---|---|---|---|
| 1 | 0 | 1600 | 3 | | air | 3.93 | 300 |
| | | 1600 | 1 | 30 | Ar | 3.94 | 320 |
| | | 1600 | 1 | 30 | vac | 3.95 | 330 |
| 2 | 0.5 | 1600 | 3 | | air | 3.92 | 360 |
| | | 1600 | 10 | | air | 3.92 | 340 |
| | | 1550 | 0.5 | 30 | Ar | 3.92 | 610 |
| | | 1600 | 1 | 30 | Ar | 3.93 | 450 |
| | | 1600 | 1 | 30 | vac | 3.93 | 470 |
| 3 | 1.0 | 1600 | 3 | | air | 3.90 | 380 |
| | | 1600 | 10 | | air | 3.91 | 430 |
| | | 1550 | 0.5 | 30 | Ar | 3.91 | 620 |
| | | 1600 | 1 | 30 | Ar | 3.92 | 620 |
| | | 1600 | 1 | 30 | vac | 3.92 | 650 |
| 4 | 1.5 | 1650 | 3 | | air | 3.80 | 450 |
| | | 1650 | 10 | | air | 3.81 | 440 |
| | | 1550 | 0.5 | 30 | Ar | 3.82 | 420 |
| | | 1650 | 1 | 30 | vac | 3.83 | 520 |
| | | 1650 | 1 | 45 | vac | 3.84 | 530 |
| 5 | 3.0 | 1700 | 3 | | air | 3.62 | 370 |
| | | 1700 | 10 | | air | 3.64 | 380 |
| | | 1650 | 1 | 60 | Ar | 3.71 | 420 |
| | | 1650 | 1 | 60 | vac | 3.72 | 440 |

Having described preferred embodiments of the present invention, it is to be recognized that variations and modifications thereof within the spirit of the invention may become apparent to those skilled in the art, and the scope of the invention is to be determined by the appended claims and their equivalents.

What is claimed is:

1. The process of manufacturing a sintered ceramic body of α-alumina reinforced with β'''-alumina comprising the steps of:
    (a) preparing a mixture of α-alumina powder and salts of sodium and magnesium, the mol ratio of the sodium to magnesium being 1:2;
    (b) calcining said mixture at a temperature of from 800° to 850° C. to provide a calcined mixture having a molar composition of (100-5X)Al$_2$O$_3$+X-(Na$_2$O+4MgO), where X is not more than 3;
    (c) forming the calcined mixture into a dense green body;
    (d) reaction sintering the green body at a temperature and for a time sufficient to form an α-alumina matrix having distributed therein β'''-alumina grains.

2. The process of claim 1, wherein X is from 0.5 to 3.

3. The process of claim 1, wherein said mixture is a wet mixture which is dried prior to calcining.

4. The process of claim 3, wherein said α-alumina is mixed with an aqueous solution of said salts of sodium and magnesium.

5. The process of claim 1, wherein said sintering step is performed by hot-pressing the green body at a temperature of from 1550° C. to 1650° C. under 30-60 MPa for 1 to 3 hours.

6. The process of claim 1, wherein said sintering step is performed by sintering the green body at a temperature of from 1600° C. to 1700° C. for 1 to 10 hours.

7. An alumina ceramic comprising a matrix of α-alumina having distributed therein needle-shaped grains of β'''-alumina which have been formed in situ in said matrix.

* * * * *

UNITED STATES PATENT AND TRADEMARK OFFICE
CERTIFICATE OF CORRECTION

PATENT NO. : 5,081,082
DATED : January 14, 1992
INVENTOR(S) : KIM HAI-DOO ET AL.

It is certified that error appears in the above-identified patent and that said Letters Patent is hereby corrected as shown below:

On the title page, item [73], Assignee, change "Korean" to --Korea--.

Signed and Sealed this

Seventeenth Day of September, 1996

Attest:

BRUCE LEHMAN

Attesting Officer

Commissioner of Patents and Trademarks